INVENTORS.
John D. Ball,
Frank J. Feagin,
BY  John H. Sasseen,

*John B. Davidson*
ATTORNEY.

United States Patent Office 2,951,976
Patented Sept. 6, 1960

2,951,976

THERMOCOUPLE PROTECTIVE CIRCUIT

John H. Sasseen, John D. Ball, and Frank J. Feagin, Houston, Tex., assignors, by mesne assignments, to Jersey Production Research Company, Tulsa, Okla., a corporation of Delaware Filed Oct. 17, 1957, Ser. No. 690,837

5 Claims. (Cl. 321—1.5)

This invention relates to squaring devices of the type wherein the current to a heater element produces an output voltage from a thermocouple that is linearly proportional to a time average of the squared function of the instantaneous magnitude of the input current. More particularly, this invention relates to a protective circuit for such a squaring device.

In connection with the interpretation of geophysical data, electronic correlation devices have been developed which make extensive use of circuits for the purpose of producing output voltages that are linearly proportional to the average of the squared functions of an input current applied thereto. Examples of circuits of this nature are found in the co-pending application of Frank J. Feagin et al., Serial No. 382,588, filed September 28, 1953, for "Method and Apparatus for Interpreting Geophysical Data." A very satisfactory squaring device for use in such circuitry has been found to be of the thermocouple type. Unfortunately, the heater elements of these thermocouple devices to which the input current is applied are relatively fragile and not capable of passing a large overload current for an appreciable length of time. It is the nature of geophysical signals to vary widely in amplitude, so as to require the thermocouple squaring device to accept large instantaneous peak currents, but because the time duration of these large instantaneous currents is usually short, the average power into the thermocouple is low. This the thermocouple can tolerate. However, if these large peak currents are sustained for a time interval long enough so that the average power may be greater than the average power that may be safely passed into the heater element, it will burn out.

It is one object of this invention to provide a simple fast acting circuit for the protection of the heater element of a thermocouple squaring device against high average powers without impeding the flow of a large instantaneous current through the heater element.

Figure 1:
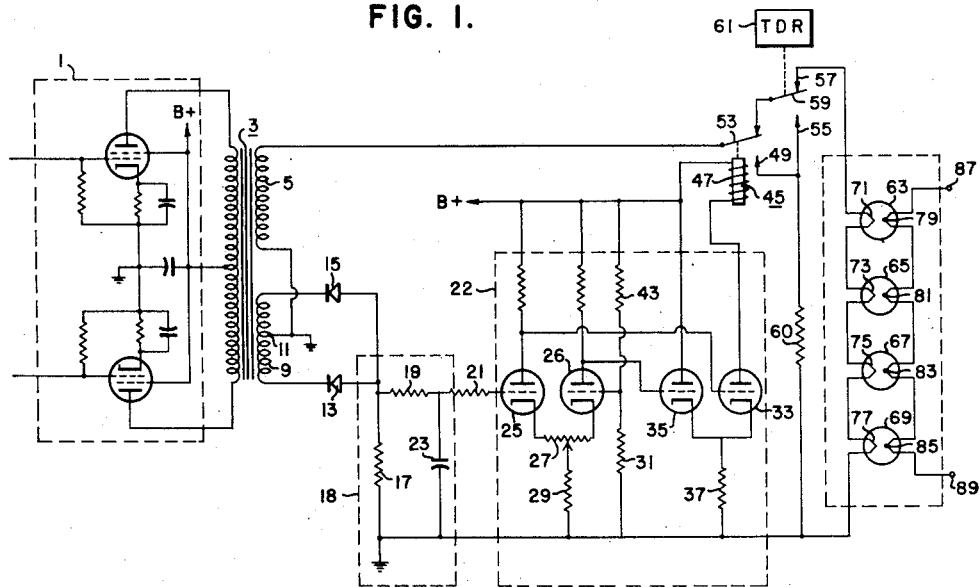
Figure 2:
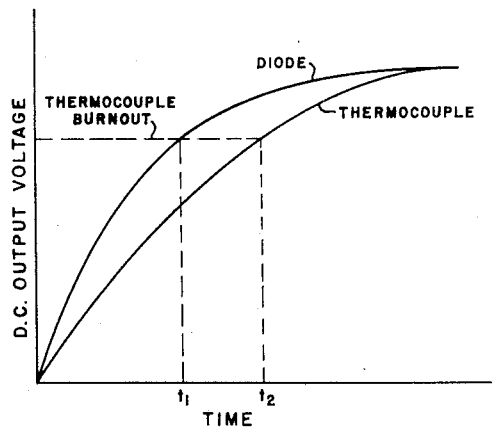

Other objects and features of the invention will become apparent upon consideration of the following description thereof when taken in connection with the accompanying drawing, wherein:

Fig. 1 is a schematic diagram of an electrical circuit in accordance with the teachings of this invention; and Fig. 2 is a graph of output voltage as a function of time for two elements shown in Fig. 1. These voltages result when a signal is suddenly applied to these two elements.

The present invention makes use of diodes or other square law devices coupled to the same source of alternating current to which the heater element of the thermocouple squaring device is coupled. The diodes (or other devices) are used to derive an output voltage that is averaged and utilized to actuate means including a fast-acting relay for decoupling the heater element from the A.C. source. The output voltage from the diode circuit (at the juncture of resistor 17 and resistor 19 in Fig. 1) varies substantially instantaneously in accordance with the square of the magnitude of the input voltage applied thereto; by averaging this output voltage at the juncture of resistor 19 and resistor 21 over an appropriate time, a delay is introduced before the relay is actuated so that the heater element will not be decoupled from the A.C. source by large amplitude signals of short duration. The output voltages of the diode circuit and of the thermocouple will have variations substantially proportional to each other with slow changes in the input voltages. The averaged output voltage of the diode circuit will decouple the thermocouple from the alternating current source only after a predetermined average power has been fed to the thermocouple.

As shown in Fig. 1, an alternating current source 1, which may be a push-pull electronic amplifier as shown, is coupled to the heater element of a plurality of current or voltage squaring devices 63, 65, 67 and 69 by means of a time delay relay 61 and an overload protective relay 45. The electrical connection is made through the contact 53 of relay 45 and contact 59 of relay 61. The heater elements 71, 73, 75, and 77 are serially connected; likewise, the output terminals of thermocouples 79, 81, 83, and 85 are serially connected so that the voltages appearing across output terminals 87 and 89 will be the sum of the individual output voltages of the thermocouple device. Electrical current source 1 includes an output transformer 3, one output winding 5 of which is coupled to the thermocouple device through the relays aforementioned. The function of time delay relay 61 is to decouple electrical circuit 1 from the thermocouples until the heaters of the electronic tubes included in the protective circuit to be described have reached operating temperatures. This time delay relay may be of the type manufactured by Haydon Manufacturing Company, Inc., Model No. 5901–2. The other contact 55 of the time delay relay is connected to a resistor element 60, the function of which is to absorb the output power of the amplifier 1 when the amplifier is decoupled from the thermocouple squaring device.

Transformer 3 includes a second output winding 9 having a centertap 11, the function of which winding is to provide an output circuit for current source 1 having an output impedance that is high in comparison with the impedance of output circuit 5. For the purpose of anticipating the flow of an average current through heater elements 71, 73, 75, and 77 sufficient in magnitude to destroy one or more of the heater elements, there is provided an anticipating protective circuit coupled to winding 9 and to relay 45. The protective circuit includes squaring devices 13 and 15, a time delay circuit 18, and a differential amplifier 22 adapted to energize the actuating winding 47 of relay 45. Time delay circuit 18 includes a serially connected capacitor 23 and resistor 19, and a resistor 17 connected in parallel with resistor 19 and capacitor 23, and is coupled to output winding 9 by means of squaring devices 13 and 15. Squaring devices 13 and 15 may be vacuum diodes, crystal diodes, or other suitable types of semi-conductor diodes which, when connected in an appropriate circuit will produce an output voltage proportional to the squared function of their input voltage. The static input-output characteristics of devices 13 and 15 and their associated circuit should be substantially the same as that of the thermocouple squaring device described heretofore over a substantial variation of output current. Devices 13 and 15 are connected in a full wave rectifying circuit, with their anodes connected together and to the juncture of resistors 17 and 19. For both halves of the A.C. circuit from current source 1, the output voltages across resistor 17 will be a squared function of the input voltage applied to devices 13 and 15 by output winding 9. The output voltage of time delay circuit 18 is coupled to a D.C. differential amplifier 22 by means of a series connected resistor 21.

Differential amplifier 22 functions to energize the actuating winding 47 of relay 45 with minimum time delay when the voltage across capacitor 23 reaches a predetermined value. The amplifier may include a pair of vacuum tubes 25 and 26 having a common cathode circuit including a centertapped resistor 27, the end terminals of which are connected to the cathodes of vacuum tubes 25 and 26 and the centertap of which is connected to ground. The control electrode of vacuum tube 26 is maintained at a constant bias by a voltage divider including serially connected resistors 31 and 43 connected between a source of positive bias voltage and ground. The resistance values of resistors 31 and 43 are adjusted so that vacuum tube 26 is normally conducting. The voltage drop across resistor 29 will bias vacuum tube 25 toward non-conduction. The plate circuit of vacuum tube 25 is coupled to the control electrode of the second vacuum tube 33 while the plate circuit of vacuum tube 26 is connected to the control electrode of vacuum tube 35. Included in the plate circuit of vacuum tube 33 is the control winding 47 of relay 45. Vacuum tubes 33 and 35 have their cathodes connected directly together; the cathodes are connected to ground through resistor 37. With no voltage across capacitor 23, tubes 25 and 35 will be conductive, and tubes 26 and 33 will be non-conductive. Relay 45 will be in the position shown in Fig. 1. When the output voltage of the delay circuit 18 rises to a value sufficient to bias vacuum tube 25 to non-conduction, vacuum tube 26 will be biased to conduction; the voltages appearing at the control electrodes of vacuum tubes 33 and 35 will vary in a manner such that vacuum tube 35 will be biased to non-conduction and vacuum tube 33 will be biased to conduction. Current will flow through the control winding 47 of relay 45 to actuate relay 45 and thus connect output winding 5 to resistor 60 through contact 49.

With reference now to Fig. 2, there is shown the voltage versus time curve for the thermocouple and for the diode, for the situation when a large signal is suddenly applied and maintained to the circuit through the transformer 3. The output in each case does not reach its maximum value suddenly, but rather builds up slowly, since the voltage is indicative of an average power. If the thermocouple voltage is allowed to reach a certain value, called the "burn-out value," the average power to the heater elements of the thermocouple will have been sufficient to destroy them. To prevent this occurrence, the diode circuit is designed to reach this critical voltage before the thermocouple does and when it reaches this critical voltage, to open the channel to the thermocouple. Manifestly, the time for the diode to reach the critical burnout voltage, plus the time delay in relay 45, must be less than the time in which the thermocouple reaches the burn-out value. Therefore, the time $t_1$ noted on Fig. 2, plus the delay time required for actuation of relay 45, should be less than the time $t_2$ required to burn-out the thermocouple heater elements.

The apparatus described above has been found to protect thermocouple heaters against damage without fail. In a typical installation, the incidence of thermocouple burn-out was reduced to the point where burn-outs have been entirely eliminated.

Although the embodiment disclosed in the preceding application is preferred, other modifications will be apparent to those skilled in the art which do not depart from the broadest aspect of the scope of the invention.

What we claim is:

1. In combination: thermocouple squaring means comprising at least one bimetallic element responsive to the heat generated by current flowing through a heater element associated therewith to produce an output voltage variable as a function of the average squared current through said heater element, said bimetallic element being adapted to produce a given output voltage when a maximum safe current flows through the heater element; an alternating current source having first and second output circuit means; relay means, having an actuating coil, for coupling said first output circuit to said heater element means through normally closed contacts thereon; differential amplifier means for energizing said actuating coil when a voltage at input terminals thereof exceeds a predetermined value, to decouple said first output circuit from said heater element means; squaring circuit means having a square law characteristic of output voltage as a function of input voltage coupled to said second output circuit for energization thereby; and a resistive-capacitive averaging circuit coupled to said squaring circuit means and to said differential amplifier means for averaging the output voltage of said squaring circuit means and coupling the averaged voltage to said input terminals of said differential amplifier means, said averaging circuit being adapted to produce a voltage at said input terminals of said predetermined value slightly ahead of production of said given output voltage by said bimetallic element.

2. In combination: thermocouple means of the type adapted to produce an output voltage variable as a squared function of the input power applied to heater element means associated therewith, said thermocouple means being adapted to produce a given output voltage when said heater element absorbs power sufficient for burnout thereof; an alternating current source having a high impedance output circuit and a low impedance output circuit; relay means coupled to said high impedance circuit adapted to couple and decouple said high impedance output circuit and said heater element means; squaring circuit means coupled to said low impedance circuit and having an output voltage variable proportional to the square of an input voltage coupled thereto by said low impedance circuit; a resistive-capacitive averaging circuit coupled to said squaring circuit means adapted to average over a given time the output voltage of said squaring circuit means so as to produce a predetermined output voltage prior to attainment of said given output voltage by the thermocouple means; and means responsive to attainment by said averaging circuit of said predetermined output voltage operative to actuate said relay means to decouple said high impedance output circuit from said heater element means.

3. In combination: thermocouple means of the type adapted to produce an output voltage proportional to the squared average of an input current coupled to heater element means associated therewith, said heater element means being adapted to dissipate only a predetermined average value of power, the thermocouple being adapted to produce a given output voltage when the heater element means dissipates said predetermined average power; an alternating voltage source having a high impedance output circuit and a low impedance output circuit; relay means coupled to said high impedance circuit adapted to connect said high impedance output circuit to said heater element means, said relay means having a given delay time for operation thereof; rectifier means coupled to said low impedance circuit and having an output voltage proportional to the square of an input voltage coupled thereto by said low impedance circuit; a resistive-capacitative averaging circuit coupled to said rectifier means adapted to average over a given time the output voltage of said rectifier means; and means responsive to attainment by said averaging circuit of a predetermined output voltage operative to actuate said relay means to disconnect said high impedance output circuit from said heater element means; the time required by said current through said heater element means to attain said predetermined average value being greater than the time required by said averaging circuit to produce said predetermined output voltage plus the delay time required for operation of said relay.

4. In combination: a thermocouple electrical squaring device including heater element means and thermocouple output means, the thermocouple output means being adapted to produce an output voltage variable as the square of the current through said heater element means, said heater element means being adapted to burn out upon attainment of a given voltage by said thermocouple means; an alternating current source having a fluctuating average output voltage; a resistor; relay means having an actuating coil, said relay means being in circuit relationship with said resistor and with said heater element means to couple said alternating current source to said heater element means when said actuating coil is energized, and to connect said alternating current source to said resistor when said actuating coil is not energized; first circuit means coupled to said alternating current source adapted to produce an output voltage proportional to the square of the amplitude of the voltage of said alternating current source, the output voltage of said first circuit means varying substantially instantaneously with variations in the voltage of said alternating current source; second circuit means having an output circuit coupled to said actuating coil for energization thereof, and an input circuit; said second circuit means being adapted to energize said actuating coil when a voltage applied to said input circuit attains a predetermined value; and a voltage averaging circuit coupling the output voltage of said first circuit means to said input circuit of said second circuit means; said voltage averaging circuit being adapted to average the output voltage of said first circuit means so that the voltage applied to the input circuit of said second circuit means will attain said predetermined value slightly ahead of attainment of said given voltage by said thermocouple means to actuate said relay and decouple said alternating current source from said heater means.

5. In combination: a thermocouple electrical squaring device including heater element means and thermocouple output means, the thermocouple output means being adapted to produce an output voltage variable as the square of the current through said heater element means, said heater element means being subject to burn-out upon attainment of a given voltage by said thermocouple means; an alternating current source having a fluctuating average output voltage; relay means having an actuating coil, said relay means being in circuit relationship with said heater element means to couple said alternating current source to said heater element means when said actuating coil is energized and to disconnect said alternating current source from said heater element means when said actuating coil is de-energized; first circuit means coupled to said alternating current source adapted to produce an output voltage proportional to the square of the amplitude of the voltage of said alternating current source, the output voltage of said first circuit means varying substantially instantaneously with variations in voltage of said alternating current source; second circuit means having an output circuit coupled to said actuating coil for energization thereof, and an input circuit; said circuit means being adapted to energize said actuating coil when a voltage applied to said input circuit attains a predetermined value; and a voltage averaging circuit coupling the output voltage of said first circuit means to said input circuit of said second circuit means, said voltage averaging circuit being adapted to average the output voltage of said first circuit means so that the voltage applied to the input circuit of said second circuit means will attain said predetermined value slightly ahead of attainment of said given voltage by said thermocouple means to actuate said relay and decouple said alternating current source from said heater means.

References Cited in the file of this patent

UNITED STATES PATENTS

| | | |
|---|---|---|
| 2,280,898 | Dyer et al. | Apr. 28, 1942 |
| 2,399,322 | Carlin | Apr. 30, 1946 |
| 2,590,973 | Jordan | Apr. 1, 1952 |
| 2,671,874 | Friedrichs | Mar. 9, 1954 |
| 2,811,675 | McGee et al. | Oct. 29, 1957 |